US012803318B2

(12) United States Patent
Kim et al.

(10) Patent No.: US 12,803,318 B2
(45) Date of Patent: Nov. 17, 2026

(54) POWER SUPPLY CIRCUIT AND ELECTRONIC DEVICE COMPRISING SAME

(71) Applicant: SAMSUNG ELECTRONICS CO., LTD., Suwon-si (KR)

(72) Inventors: Yeongil Kim, Suwon-si (KR); Seungbeom Kang, Suwon-si (KR); Sungyong Kim, Suwon-si (KR); Sanghyun Ryu, Suwon-si (KR); Hyunjun Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 839 days.

(21) Appl. No.: 18/138,496

(22) Filed: Apr. 24, 2023

(65) Prior Publication Data

US 2023/0261499 A1 Aug. 17, 2023

Related U.S. Application Data

(63) Continuation of application No. PCT/KR2021/014779, filed on Oct. 21, 2021.

(30) Foreign Application Priority Data

Nov. 6, 2020 (KR) ........................ 10-2020-0147348

(51) Int. Cl.
*H02J 7/94* (2026.01)

(52) U.S. Cl.
CPC .............. *H02J 7/953* (2026.01); *H02J 7/947* (2026.01)

(58) Field of Classification Search
CPC .................................. H02J 7/947; H02J 7/953
See application file for complete search history.

(56) References Cited

U.S. PATENT DOCUMENTS

| | | | | |
|---|---|---|---|---|
| 10,084,212 | B2 | 9/2018 | Liao et al. | |
| 10,367,365 | B2 | 7/2019 | Wu et al. | |
| 10,622,816 | B2 | 4/2020 | Stewart et al. | |
| 2012/0042187 | A1 | 2/2012 | Morimura et al. | |
| 2019/0181667 | A1* | 6/2019 | Yu | H02J 7/663 |
| 2019/0348846 | A1* | 11/2019 | El Markhi | H02J 7/663 |

(Continued)

FOREIGN PATENT DOCUMENTS

| | | | |
|---|---|---|---|
| JP | 2018-117441 | A | 7/2018 |
| KR | 10-0184502 | B1 | 5/1999 |

(Continued)

OTHER PUBLICATIONS

Communication issued by Korean Intellectual Property Office on Sep. 9, 2025 in Korean Application No. 10-2020-0147348.

(Continued)

*Primary Examiner* — Robert Grant
(74) *Attorney, Agent, or Firm* — Sughrue Mion, PLLC

(57) ABSTRACT

An electronic includes: a battery; a power supply circuit electrically connected to the battery; and a processor configured to receive power through the power supply circuit, wherein the power supply circuit may be further configured to, based on a ship mode command received from the processor at a first time, switch an operation mode of the electronic device to a ship mode of the electronic device by shutting off power supplied to the processor by the battery at a second time that is delayed from the first time by a preset time.

14 Claims, 8 Drawing Sheets

(56) References Cited

U.S. PATENT DOCUMENTS

| | | | |
|---|---|---|---|
| 2019/0393451 | A1 | 12/2019 | Ishihara et al. |
| 2020/0091740 | A1 | 3/2020 | Isaacs et al. |

FOREIGN PATENT DOCUMENTS

| | | | |
|---|---|---|---|
| KR | 10-0244207 | B1 | 2/2000 |
| KR | 10-2007-0112660 | A | 11/2007 |
| KR | 10-0929036 | B1 | 11/2009 |
| KR | 10-2010-0074526 | A | 7/2010 |
| KR | 10-1084799 | B1 | 11/2011 |
| KR | 10-2013-0002921 | A | 1/2013 |

OTHER PUBLICATIONS

International Search Report (PCT/ISA/210) issued by the International Searching Authority on Jan. 26, 2022 for International Patent Application No. PCT/KR2021/014779.

Written Opinion (PCT/ISA/237) issued by the International Searching Authority on Jan. 26, 2022 for International Patent Application No. PCT/KR2021/014779.

* cited by examiner

POWER SUPPLY CIRCUIT AND ELECTRONIC DEVICE COMPRISING SAME

CROSS-REFERENCE TO RELATED APPLICATION

This application is a by-pass continuation application of International Application No. PCT/KR2021/014779, filed on Oct. 21, 2021, which is based on and claims priority to Korean Patent Application No. 10-2020-0147348, filed on Nov. 6, 2020, in the Korean Intellectual Property Office, the disclosures of which are incorporated by reference herein their entireties.

BACKGROUND

1. Field

The disclosure relates to a power supply circuit of an electronic device.

2. Description of Related Art

A portable electronic device includes a battery and may be driven using power supplied from the battery. A portable electronic device including a battery may need to be charged when a predetermined amount of power or more is used. A battery of a portable electronic device may be charged with a predetermined amount of power using a charger. When a portable electronic device is powered off, a circuit and a battery of a system may be separated such that a remaining battery amount is maintained for a long period of time.

A ship mode removes a leakage current flowing in an electronic device by breaking electrical connections between all blocks in the electronic device. In an auto ship mode, an electronic device enters a ship mode by itself when a voltage of a battery is less than or equal to a predetermined voltage. In a forced ship mode, an electronic device immediately enters a ship mode when a ship mode command is received regardless of a voltage of a battery. Operating in the forced ship mode may be similar to forcibly detaching a battery of an electronic device.

SUMMARY

Provided are an electronic device and a method for switching an operation mode of the electronic device to a ship mode.

Additional aspects will be set forth in part in the description which follows and, in part, will be apparent from the description, or may be learned by practice of the presented embodiments.

According to an aspect of the disclosure, an electronic device includes: a battery; a power supply circuit electrically connected to the battery; and a processor configured to receive power through the power supply circuit, wherein the power supply circuit may be further configured to, based on a ship mode command received from the processor at a first time, switch an operation mode of the electronic device to a ship mode of the electronic device by shutting off power supplied to the processor by the battery at a second time that is delayed from the first time by a preset time.

The processor may be further configured to, based on a command to power off the electronic device being received, generate the ship mode command and transmit the ship mode command to the power supply circuit.

The processor may be further configured to, based on a voltage of the battery, the voltage being less than or equal to a preset voltage, generate the ship mode command and transmit the generated ship mode command to the power supply circuit.

The processor may be further configured to perform sequences of powering off the electronic device before the second time.

The power supply circuit may include: a control circuit configured to receive the ship mode command from the processor and delay performing the ship mode command until the second time; a power management integrated circuit (PMIC) electrically connected to the control circuit and configured to manage power supplied to the processor; and a connection control switch electrically connected to the PMIC and the battery, and configured to control an electrical connection between the PMIC and the battery based on the ship mode command.

The control circuit may be further configured to delay performing the ship mode command until the second time by using firmware.

The control circuit may be further configured to delay performing the ship mode command until the second time by using a delay circuit.

The connection control switch may be further configured to electrically connect with the PMIC and the battery based on an input for powering on the electronic device.

The electronic device may further include a charging interface electrically connected to the battery through the connection control switch, the charging interface being configured to receive power from an external power source.

The connection control switch may be further configured to, based on power supplied from the external power source via the charging interface, electrically connect the PMIC and the battery.

The electronic device may be a mobile communication terminal, a smartwatch, or smart glasses.

According to an aspect of the disclosure, a method performed by an electronic device, includes: receiving, by a power supply circuit of the electronic device, a ship mode command from a processor of the electronic device at a first time; and switching, by the power supply circuit, an operation mode of the electronic device to a ship mode by shutting off power supplied to the processor by a battery at a second time that is delayed from the first time by a preset time.

The method may further include: receiving, by the processor, a command to power off the electronic device; based on the command to power off being received, generating, by the processor, the ship mode command; and transmitting, by the processor, the generated ship mode command to the power supply circuit.

The receiving the ship mode command may include receiving, by a control circuit of the power supply circuit, the ship mode command from the processor, and the switching the operation mode may include: delaying, by the control circuit, performing the received ship mode command until the second time; and controlling, by a connection control switch of the power supply circuit, an electrical connection between a power management integrated circuit of the power supply circuit and the battery based on the ship mode command.

A voltage value of power supplied to the processor by the power supply circuit is less than or equal to a preset voltage value after the second time.

According to another aspect of the disclosure, an electronic device includes: a battery; a power supply circuit electrically connected to the battery; and a processor configured to: receive power through the power supply circuit. When the processor generates a transportation mode command for switching the operation mode of the electronic device to the transportation mode at a first time, a voltage value of power supplied to the processor by the power supply circuit after a second time delayed by a predetermined time from the first time indicates a preset voltage value or less.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, various embodiments of the disclosure will be described with reference to the accompanying drawings. However, this is not intended to limit the disclosure to specific embodiments, and various modifications, equivalents, and/or alternatives of the embodiments of the disclosure are included.

Figure 1:
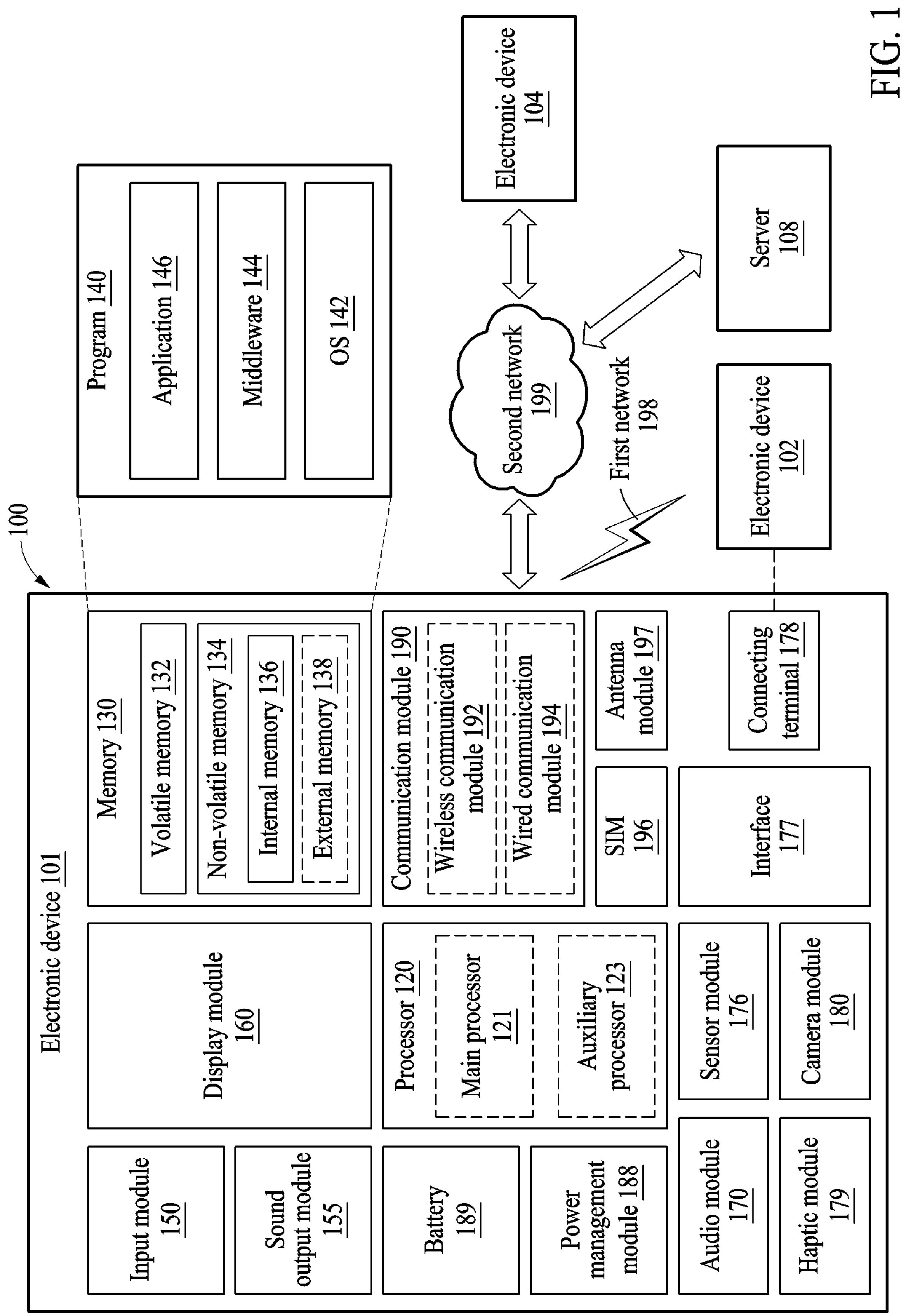
FIG. 1 is a block diagram illustrating an electronic device in a network environment according to an embodiment.

FIG. 1 is a block diagram illustrating an electronic device in a network environment according to one or more embodiments.

FIG. 1 is a block diagram illustrating an electronic device 101 in a network environment 100 according to one or more embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to one embodiment, the electronic device 101 may communicate with the electronic device 104 via the server 108. According to one embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to one embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to one embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to one embodiment, the auxiliary processor 123 (e.g., an ISP or a CP) may be implemented as a portion of another component (e.g., the camera module 180 or the communication module 190) that is functionally related to the auxiliary processor 123. According to one embodiment, the auxiliary processor 123 (e.g., an NPU) may include a hardware structure specified for artificial intelligence (AI) model processing. An AI model may be generated through machine learning. Such learning may be performed by, for example, the electronic device 101 in which AI is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to one embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to one embodiment, the display module 160 may include a touch sensor adapted to sense a touch, or a pressure sensor adapted to measure an intensity of a force incurred by the touch.

The audio module 170 may convert a sound into an electric signal or vice versa. According to one embodiment, the audio module 170 may obtain the sound via the input module 150 or output the sound via the sound output module 155 or an external electronic device (e.g., an electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to one embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to one embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to one embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to one embodiment, the haptic module 179 may include, for example, a motor, a piezoelectric element, or an electric stimulator.

The camera module 180 may capture a still image and moving images. According to one embodiment, the camera module 180 may include one or more lenses, image sensors, ISPs, or flashes.

The power management module 188 may manage power supplied to the electronic device 101. According to one embodiment, the power management module 188 may be implemented as, for example, at least a part of a power management integrated circuit (PMIC).

The battery 189 may supply power to at least one component of the electronic device 101. According to one embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support a direct (e.g., wired) communication or a wireless communication. According to one embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to one embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to one embodiment, the antenna module 197 may include an antenna including a radiating element including a conductive material or a conductive pattern formed in or on a substrate (e.g., a printed circuit board (PCB)). According to one embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to one embodiment, another component (e.g., a radio frequency integrated circuit (RFIC)) other than the radiating element may be additionally formed as a part of the antenna module 197.

According to one or more embodiments, the antenna module 197 may form an mmWave antenna module. According to one embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to one embodiment, all or some of operations to be executed by the electronic device 101 may be executed at one or more external electronic devices (e.g., the external electronic devices 102 or 104, or the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, cloud computing, distributed computing, mobile edge computing (MEC), or client-server computing technology may be used, for example. The electronic device 101 may provide ultra low-latency services using, e.g., distributed computing or MEC. In another embodiment, the external electronic device 104 may include an Internet-of-things (IoT) device. The server 108 may be an intelligent server using machine learning and/or a neural network. According to one embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to one or more embodiments may be one of various types of electronic devices. The electronic device may include, for example, a portable communication device (e.g., a smartphone), a computer device, a portable multimedia device, a portable medical device, a camera, a wearable device, or a home appliance device. According to one embodiment of the disclosure, the electronic device is not limited to those described above.

One or more embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. Terms such as "1st," "2nd", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used in connection with one or more embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to one embodiment, the module may be implemented in a form of an application-specific integrated circuit (ASIC).

One or more embodiments as set forth herein may be implemented as software (e.g., the program 140) including one or more instructions that are stored in a storage medium (e.g., the internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method according to one or more embodiments of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to one or more embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

Figure 2:
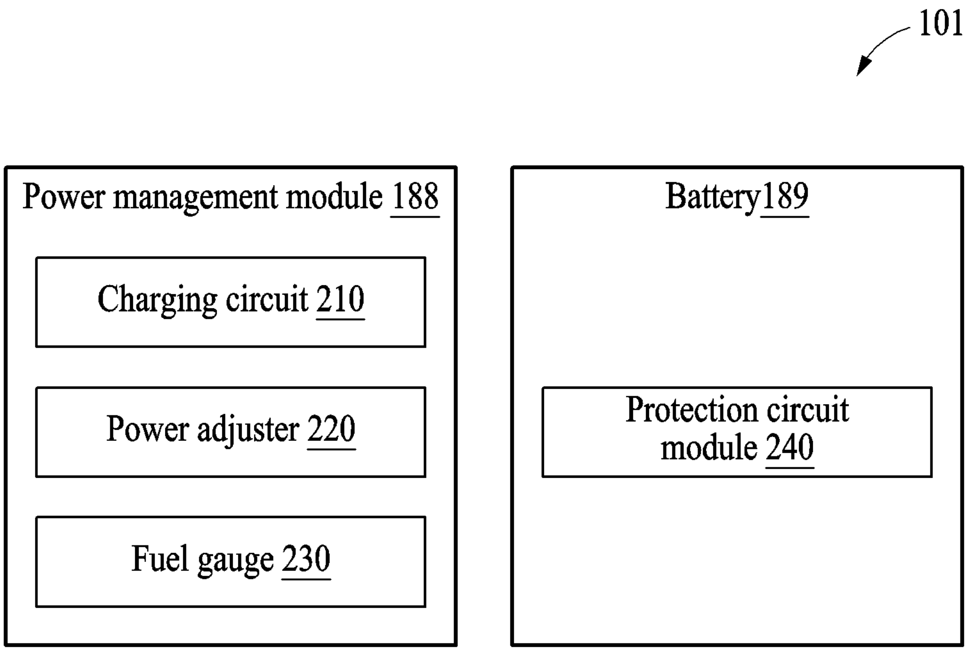
FIG. 2 is a block diagram of a power management module and a battery according to an embodiment.

FIG. 2 is a block diagram of a power management module and a battery according to one or more embodiments.

Referring to FIG. 2, the power management module 188 may include a charging circuit 210, a power adjuster 220, or a fuel gauge 230.

The charging circuit 210 may charge the battery 189 using power supplied from an external power source outside the electronic device 101. According to an embodiment, the charging circuit 210 may select a charging scheme (e.g., normal charging or quick charging) based at least in part on a type of the external power source (e.g., a power outlet and USB or wireless charging), a magnitude of power supplied from the external power source (e.g., about 20 Watts (W) or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in a form of a Low Drop Out (LDO) regulator or a switching regulator. For example, the power adjuster 220 may include a Pulse Width Modulation (PWM) engine 510 to be described later with reference to FIG. 5.

The fuel gauge 230 may measure use state information about the battery 189 (e.g., a capacity, a number of times of charging or discharging, a voltage, or a temperature of the battery 189). For example, the fuel gauge 230 may include a battery cell voltage sensing circuit 550 and a battery current sensing circuit 580 to be described later with reference to FIG. 5.

The power management module 188 may determine, using, for example, the charging circuit 210, the power adjuster 220, or the fuel gauge 230, charging state information (e.g., lifetime, overvoltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. When it is determined that the state of the battery 189 is abnormal, the power management module 188 may adjust the charging of the battery 189 (e.g., reduce the charging current or voltage, or stop the charging). According to an embodiment, at least some of functions of the power management module 188 may be performed by an external control device (e.g., the processor 120).

According to an embodiment, the battery 189 may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the fuel gauge 230, or the power management module 188. According to an embodiment, the corresponding sensor (e.g., a temperature sensor) of the sensor module 176 may be included as part of the PCM 240, or may be disposed near the battery 189 as a separate device.

Figure 3:
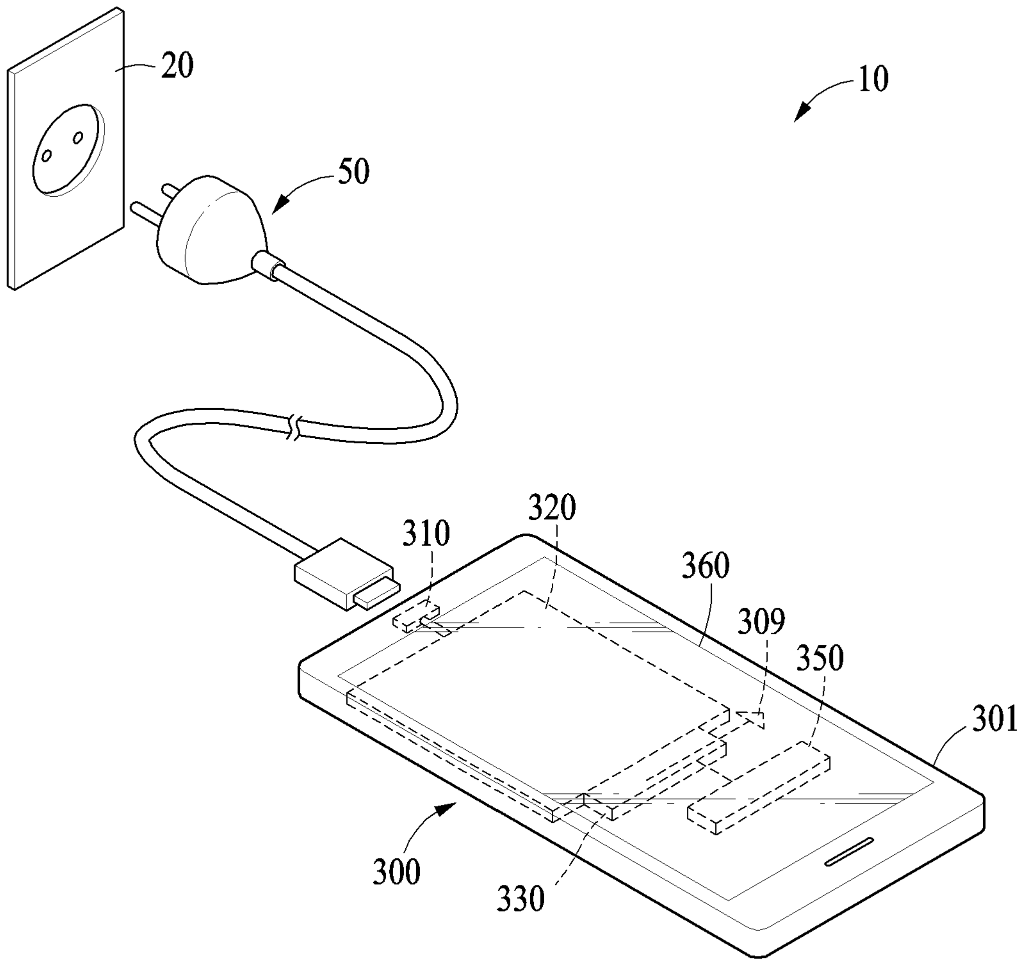
FIG. 3 is an example of an electronic device charging environment according to an embodiment.

FIG. 3 is an example of an electronic device charging environment according to an embodiment.

Referring to FIG. 3, a charging environment 10 of an electronic device may include a travel adapter 50 and an electronic device 300 (e.g., the electronic device 101 of FIG. 1). For example, the electronic device 300 may include a mobile communication terminal, a smartwatch, or smart glasses. Smart glasses may provide virtual reality or augmented reality to a user through a display, but embodiments are not limited thereto.

Referring to FIG. 3, in the charging environment 10, one side of the travel adapter 50 is connected to a static power source 20, and power supplied from the static power source 20 may be transmitted to the electronic device 300 that is connected to the other side of the travel adapter 50.

The electronic device 300 may include a charging interface 310 (e.g., the interface 177 of FIG. 1), a power supply circuit 330 (e.g., the power management module 188 of FIG. 1), a battery 320 (e.g., the battery 189 of FIG. 1), and a load 350. According to an embodiment, the electronic device 300 may further include a ground member 309 that helps the power supply circuit 330 (or a charging circuit) to be grounded. The ground member 309 may include at least some components made of a metal material included in the electronic device 300. For example, the ground member 309 may include at least some of a ground region of a PCB included in the electronic device 300, at least a portion of a housing 301, a metal sheet disposed on a rear surface of a display 360 (e.g., the display module 160 of FIG. 1), and a metal structure surrounding the battery 320.

According to an embodiment, the electronic device 300 may further include the housing 301 and the display 360 disposed on one surface of the housing 301 and exposed through the one surface and may drive the display 360 using power charged to the battery 320 or power transmitted through the charging interface 310. The display 360 may output an object related to an amount of remaining battery charge of the battery 320.

For example, the charging interface 310 may have a socket shape into which the one side of the travel adapter 50 is inserted. The charging interface 310 may transmit power transmitted through a wire to the power supply circuit 330. According to an embodiment, the charging interface 310 may include a USB interface or a micro USB interface, but embodiments are not limited thereto. According to an embodiment, the charging interface 310 may include an element (e.g., an antenna or a coil for wireless charging) related to wireless charging. For example, the charging interface 310 may receive power by wire or wirelessly from an external power source.

The power supply circuit 330 may be electrically connected to the charging interface 310. According to an embodiment, the electronic device 300 may further include a signal wire (e.g., flexible PCB (FPCB) or PCB in which a cable or a signal line is formed) that electrically connects the power supply circuit 330 and the charging interface 310. The power supply circuit 330 may convert a voltage of power transmitted through the charging interface 310, charge the battery 320 using the converted power, or supply the transmitted power to the load 350.

According to an embodiment, the power supply circuit 330 may stably supply power to the load 350 and efficiently charge the battery 320 by controlling a charge state and a discharge state of the battery 320.

The load 350 may be electrically connected to the power supply circuit 330 and consume power stored in the battery 320 or power supplied through the charging interface 310. For example, the load 350 may include at least one processor (e.g., the processor 120 of FIG. 1). Alternatively, the load 350 may include the display 360. Alternatively, the load 350 may include a component that operates power supplied through the battery 320 or the charging interface 310 among at least one component disposed in the electronic device 300. For example, the load 350 may include a least one of a camera module, a communication module, a speaker, a microphone, or at least one sensor.

The foregoing description describes the travel adapter 50 in consideration of wired charging, but a wireless charger may replace the travel adapter 50 in a wireless charging environment. In the electronic device 300, wireless power supplied from the wireless charger may be supplied to the battery 320 or the load 350 through the power supply circuit 330. For example, the wireless charger may include an external electronic device including an antenna for wireless charging.

Figure 4:
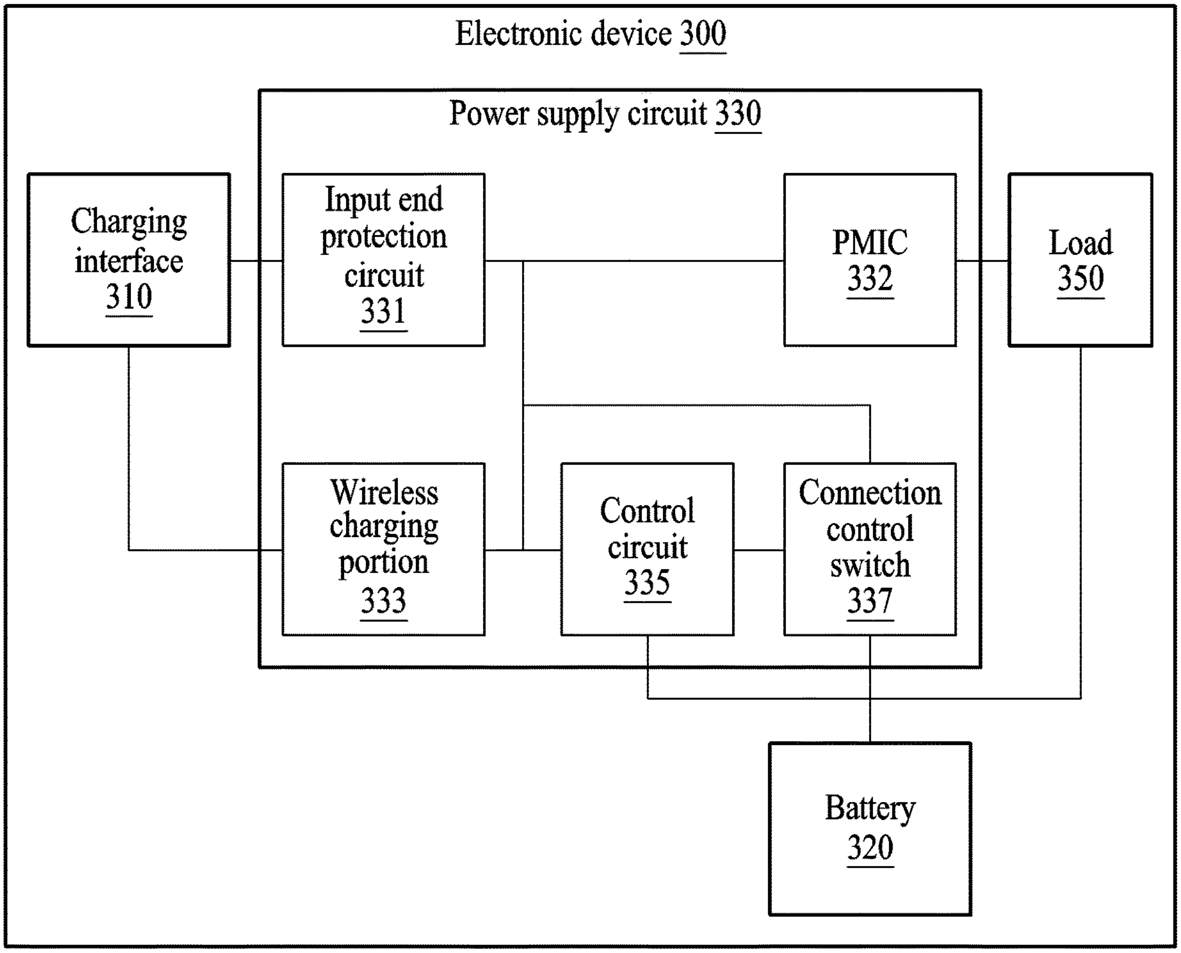
FIG. 4 is an example of a portion of an electronic device including a power supply circuit according to an embodiment.

FIG. 4 is an example of a portion of an electronic device including a power supply circuit according to an embodiment.

Referring to FIG. 4, the electronic device 300 may include the battery 320, the power supply circuit 330, and the load 350. The power supply circuit 330 may include an input end protection circuit 331, a PMIC 332, a wireless charging portion 333, a control circuit 335, and a connection control switch 337.

According to an embodiment, the electronic device 300 may include the battery 320 that is electrically connected to the power supply circuit 330 through the connection control switch 337. The connection control switch 337 that may control a connection between the power supply circuit 330 and the battery 320 will be described in detail with reference to FIG. 5.

The input end protection circuit 331 may be connected to the charging interface 310 and the wireless charging portion 333 or the PMIC 332. When power with a voltage higher than or equal to a set voltage is supplied from the travel adapter 50 through the charging interface 310, the input end protection circuit 331 may protect the power supply circuit 330 by shutting off a corresponding overvoltage. The charging interface 310 may be electrically connected to the battery 320 through the connection control switch 337. Depending on a design change, the input end protection circuit 331 may be omitted or its position may be changed.

The wireless charging portion 333 may include a Mass Flow Controller (MFC) circuit and a voltage divider. The MFC circuit may smooth power transmitted through the coil for wireless charging included in the charging interface 310 and transmit the smoothed power to the voltage divider. The voltage divider may divide the power transmitted through the MFC circuit and transmit the divided power to the control circuit 335 and the PMIC 332.

The PMIC 332 may receive power from an external power source through the input end protection circuit 331 and the wireless charging portion 333. According to an aspect, one side (e.g., an input side) of the PMIC 332 may be connected to the input end protection circuit 331 and an output end of the wireless charging portion 333. For example, the PMIC 332 may include a wired charging input switch connected to the input end protection circuit 331 and a wireless charging input switch connected to the wireless charging portion 333. An output end of the wired charging input switch and an output end of the wireless charging input switch may be connected to each other, and the output ends of the switches may be connected to a buck circuit. An output end of the buck circuit may be connected to the load 350.

The PMIC 332 may receive power from the battery 320 through the connection control switch 337. According to an aspect, the above-described output end of the buck circuit may be shared with one side of a power supply control switch (QBAT), and the other side of the QBAT may be connected to the connection control switch 337. The connection control switch 337 may control an electrical connection between the battery 320 and the PMIC 332. For example, the connection control switch 337 may control the electrical connection between the battery 320 and the PMIC 332 through a switch such that the connection is turned on or turned off.

The control circuit 335 may control the electrical connection between the battery 320 and the PMIC 332 by transmitting a control signal to the connection control switch 337. The control circuit 335 may be an integrated circuit (IC).

According to an aspect, the control circuit 335 may include a micro controller unit (MCU). When the load 350 is a processor (e.g., the processor 120 of FIG. 1), the MCU may receive a control command for controlling the power supply circuit 330 from the processor and control the power supply circuit 330 based on the received control command. For example, the connection control switch 337 may be controlled based on an output of the MCU. The control circuit 335 may include an MCU 560 and a delay circuit 565 to be described later with reference to FIG. 5.

According to another aspect, the control circuit 335 may include a circuit (e.g., a register) that may perform a preset operation according to the control command transmitted by the processor. The power supply circuit 330 may be controlled based on an output of a register based on the control command of the control circuit 335. For example, the connection control switch 337 may be controlled based on the output of the register.

In a state in which the electrical connection between the battery 320 and the PMIC 332 is controlled to be turned on, a leakage path is formed by a cell sensing path for the battery 320, even when the load 350 does not use any power (for example, when a system of the electronic device 300 is powered off), so a voltage of the battery 320 may reach less than or equal to 1.5 volts (V) in a short period of time, and accordingly, the battery may be degraded.

When the electrical connection between the battery 320 and the PMIC 332 is controlled to be turned off by the connection control switch 337, power is not supplied to the power supply circuit 330 unless power is supplied from an external power source, and accordingly, power may not be supplied to the load 350 as well. In this case, since there is no leakage path connected to the battery 320, a leakage current is not generated by the battery 320, and accordingly, the battery 320 may maintain a high voltage for a relatively long period of time.

A state in which the battery 320 of the electronic device 300 is separated from the power supply circuit 330 and the load 350 or an operation mode for the state may be referred to as a ship mode. In other words, when an operation mode of the electronic device 300 is switched to a ship mode, power may not be supplied to the system of the electronic device 300 by the battery 320.

Ship mode types may be classified into an auto ship mode in which the operation mode of the electronic device 300 is switched to the ship mode by itself based on a determination by the electronic device 300 without a command from a user when it is detected (e.g., by the processor 120) that a voltage value of the battery 320 is less than or equal to a preset voltage value (e.g., 2.6 V) and a forced ship mode in which the operation mode is switched to the ship mode by the command from the user regardless of the voltage value of the battery 320.

When the electronic device 300 is powered on and immediately switched to the ship mode regardless of the ship mode types, a sudden power-off of the electronic device 300 may occur. The sudden power-off of the electronic device 300 may have an impact on the electronic device 300. For example, when the sudden power-off occurs, a memory (e.g., the memory 130 of FIG. 1) of the electronic device 300 may be damaged, and the electronic device 300 may malfunction because the download of basic apps installed on the electronic device 300 gets interrupted. A method of switching the operation mode of the electronic device 300 to the ship mode in order to prevent such an impact is described in detail below with reference to FIGS. 5 to 7.

Figure 5:
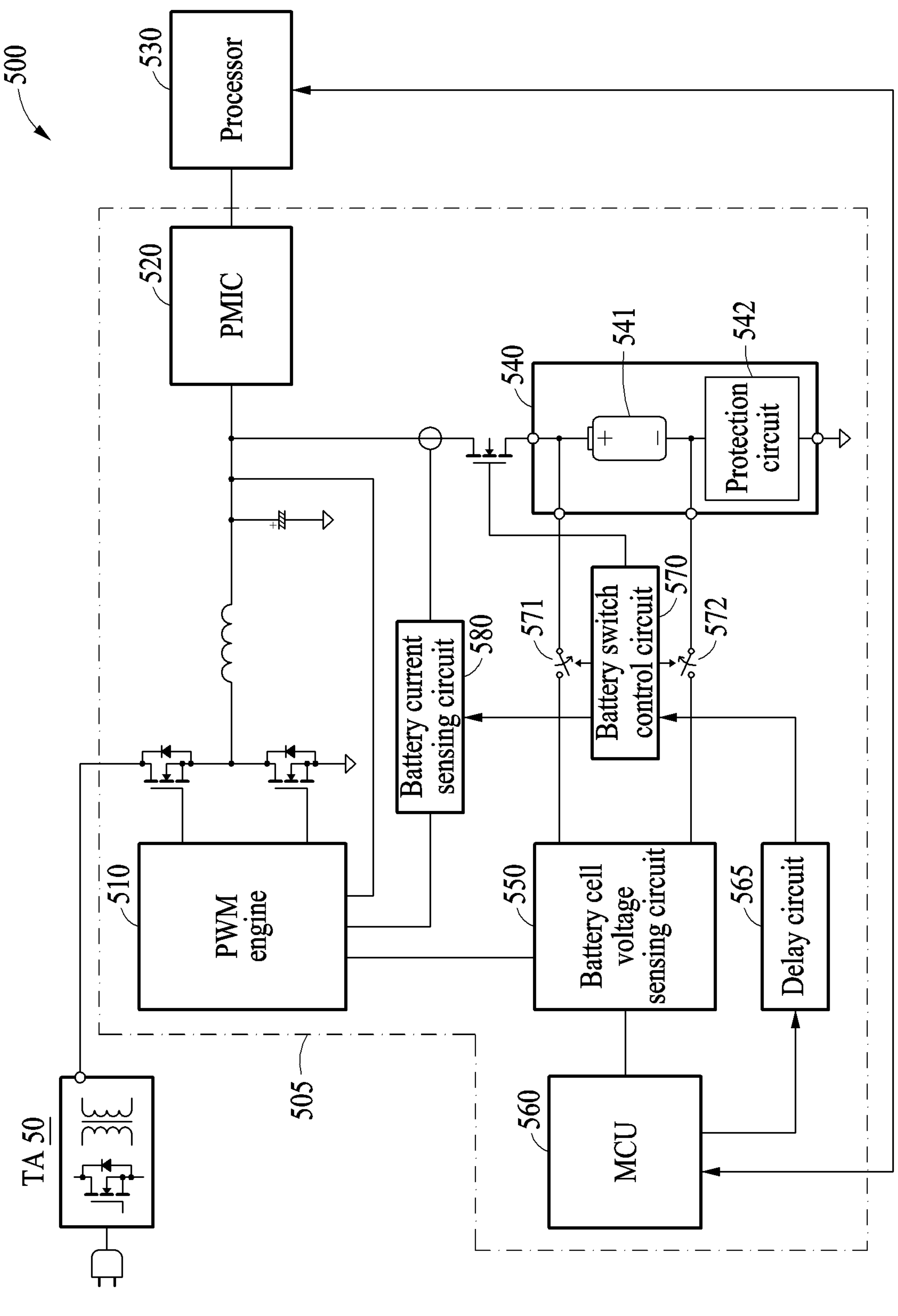
FIG. 5 is a circuit block diagram illustrating a portion of an electronic device including a power supply circuit according to an embodiment.

FIG. 5 is a circuit block diagram illustrating a portion of an electronic device including a power supply circuit according to an embodiment.

FIG. 5 illustrates a circuit block diagram of a portion of an electronic device 500 (e.g., the electronic device 101 of FIG. 1 or the electronic device 300 of FIG. 3) according to an embodiment. The electronic device 500 may include a power supply circuit 505 (e.g., the power supply circuit 330 of FIG. 4), a processor 530 (e.g., the processor 120 of FIG. 1), and a battery pack 540. Additionally, the electronic device 500 may further include a charging interface (e.g., the interface 177 of FIG. 1 or the charging interface 310 of FIG. 3).

The processor 530 may be an element corresponding to the load 350, and for example, the processor 530 may be an AP, but embodiments are not limited thereto.

The battery pack 540 may include a battery 541 (e.g., the battery 189 of FIG. 1 or the battery 320 of FIG. 3) having positive and negative electrodes and a protection circuit 542 (e.g., the PCM 240 of FIG. 2).

The power supply circuit 505 of the electronic device 500 may include the PWM engine 510, the PMIC 520 (e.g., the PMIC 332 of FIG. 4), a battery cell voltage sensing circuit 550, the MCU 560, a delay circuit 565, a battery switch control circuit 570, and a battery current sensing circuit 580.

The PWM engine 510 may generate a voltage value required by elements of the electronic device 500 based on power received through the travel adaptor 50 and supply the power to each of the elements based on the generated voltage value.

The PMIC 520 may be a PMIC that controls power supplied to the processor 530. The electronic device 500 may include a plurality of PMICs that control power of different loads, and the PMIC 520 may be a PMIC that controls the power supplied to the processor 530 among the plurality of PMICs. The PMIC 520 may control the power of the processor 530 or control power of a plurality of loads including the processor 530, but embodiments are not limited thereto.

The battery cell voltage sensing circuit 550 may sense a voltage value of the battery 541, and the battery current sensing circuit 580 may sense a current value provided by the battery 541. For example, the battery cell voltage sensing circuit 550 and the battery current sensing circuit 580 may be included in a fuel gauge (e.g., the fuel gauge 230 of FIG. 2).

The MCU 560 may receive a control command for controlling the power supply circuit 505 from the processor 530 and control each element of the power supply circuit 505 based on the control command. The MCU 560 may receive a ship mode command for switching to a ship mode from the processor 530 and control the battery switch control circuit 570 such that the battery 541 is separated from the power supply circuit 505 based on the ship mode command. In this case, the MCU 560 may delay a time at which the ship mode command is executed by the battery switch control circuit 570 through the delay circuit 565. For example, the delay circuit 565 may be implemented as a register, but embodiments are not limited thereto.

The battery switch control circuit 570 may include switches 571 and 572 that may break a connection between the battery 541 and the power supply circuit 505. When the connection between the battery 541 and the power supply circuit 505 is broken by the battery switch control circuit 570, power supplied from the battery 541 to the power supply circuit 505 may be shut off, and then the power supplied from the battery 541 to the processor 530 may also be shut off.

Even if the processor 530 is performing sequences for powering off the electronic device 500, when the power supplied to the processor 530 is shut off, the sequences for powering off the electronic device may not normally end and a sudden power-off may occur. According to an embodiment, the electronic device 500 may delay a time at which the connection between the battery 541 and the power supply circuit 505 is broken until the power-off sequences normally end in order to prevent the sudden power-off. For example, the electronic device 500 may delay the time at which the connection between the battery 541 and the power supply circuit 505 is broken through the delay circuit 565.

A method of switching an operation mode of an electronic device to a ship mode, which is performed with delay, is described in detail below with reference to FIGS. 6 and 7.

Figure 6:
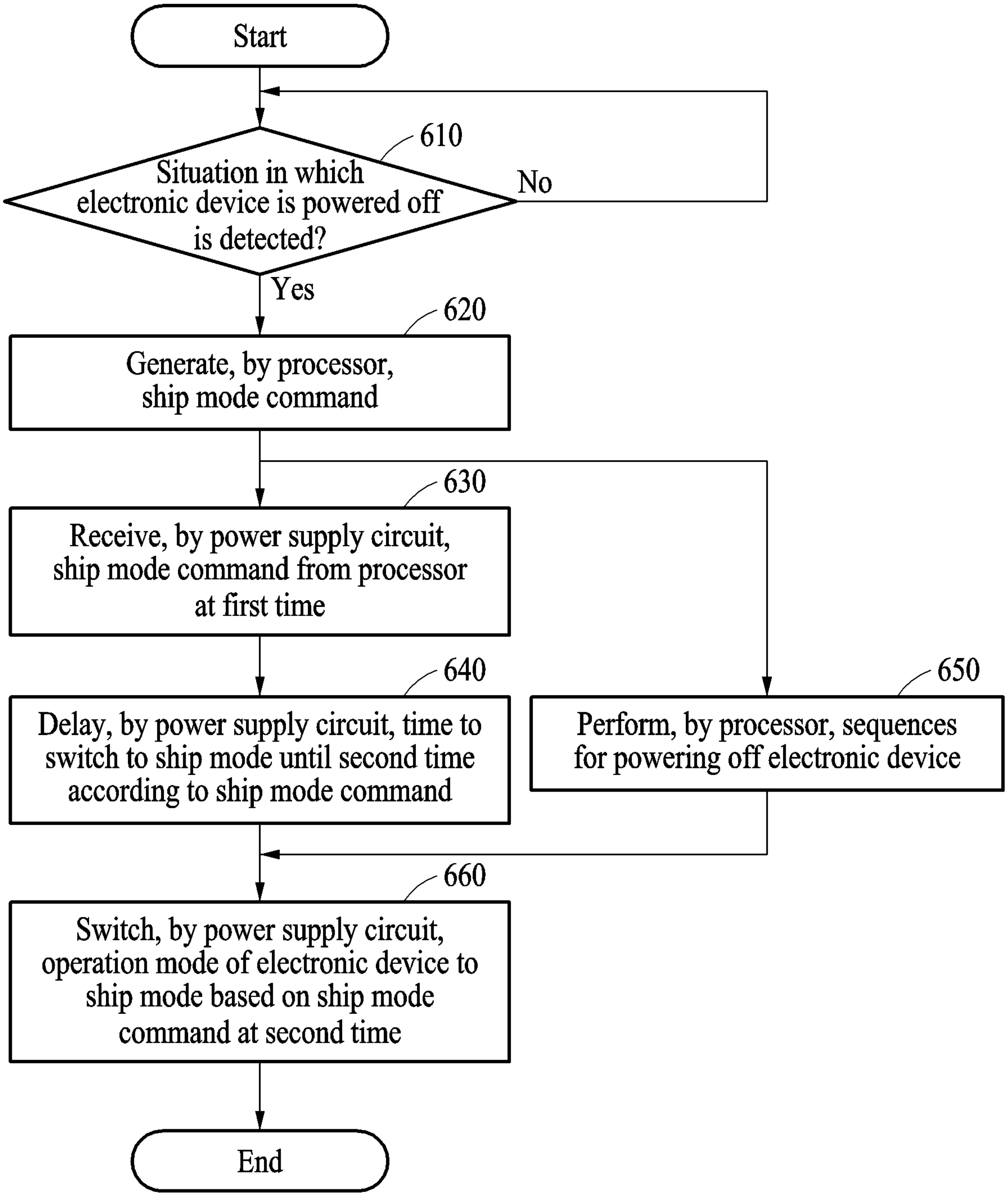
FIG. 6 is a flowchart of a method of switching an operation mode of an electronic device to a ship mode according to an embodiment.

FIG. 6 is a flowchart of a method of switching an operation mode of an electronic device to a ship mode according to an embodiment.

Operations 610 to 660 may be performed by an electronic device (e.g., the electronic device 101 of FIG. 1, the electronic device 300 of FIG. 3, or the electronic device 500 of FIG. 5).

In operation 610, a processor (e.g., the processor 120 of FIG. 1 or the processor 530 of FIG. 5) of the electronic device may determine whether a situation in which the electronic device is powered off is detected. A method of detecting the situation in which the electronic device is powered off is described in detail below with reference to FIG. 7.

In operation 620, the processor may generate a ship mode command. The processor may transmit the generated ship mode command to a power supply circuit (e.g., the power supply circuit 330 of FIG. 3 or the power supply circuit 505 of FIG. 5) of the electronic device.

The processor may perform operations 630 and 640 and operation 650 in parallel or independently.

In operation 630, a control circuit (e.g., the control circuit 335 of FIG. 3) of the power supply circuit may receive the ship mode command from the processor at a first time. For example, the control circuit 335 of the power supply circuit 330 of FIG. 3 may receive the ship mode command at the first time. As another example, the MCU 560 included in the control circuit of the power supply circuit 505 of FIG. 5 may receive the ship mode command at the first time. The first time may be a predetermined point in time at which the power supply circuit receives the ship mode command.

In operation 640, the control circuit of the power supply circuit may delay a time to switch to the ship mode until a second time according to the ship mode command. The second time may be a point in time delayed from the first time by a preset time. For example, the control circuit 335 of the power supply circuit 330 may delay performing (or executing) the ship mode command until the second time.

According to an aspect, the power supply circuit may operate a timer to which a preset time is input at a time (the first time) at which the ship mode command is received from the processor and transmit the ship mode command to a connection control switch (e.g., the connection control switch 337 of FIG. 3 or the battery switch control circuit 570 of FIG. 5) at a time (the second time) at which the timer stops.

According to another aspect, the power supply circuit may delay performing the ship mode command through or by using a delay circuit (e.g., the delay circuit 565 of FIG. 5).

According to yet another aspect, the power supply circuit may delay performing the ship mode command until the second time through or by using firmware (FW). An operation of FW may be updated in a same way as a program. When an element capable of controlling a time is included in the power supply circuit during a process of manufacturing the electronic device, the FW may be updated such that the power supply circuit may perform operation 640.

According to an embodiment, a time difference (e.g., a delay time) between the first time and the second time may be set in advance. For example, the delay time (e.g., six seconds or more) may be set by considering a processing time of operation 650, to be described later. According to another embodiment, the time difference between the first time and the second time may be updated based on the operation of the FW.

While operations 630 and 640 are being performed, operation 650 may be performed in parallel or independently.

In operation 650, the processor may perform sequences for powering off the electronic device. The sequences for powering off the electronic device may be sequences that are set in advance to normally and stably end a system of the electronic device. The sequences that are set in advance to end the system of the electronic device may include a sequence in which the processor generates the ship mode command. However, the sequence in which the processor generates the ship mode command may be performed through operation 620, and the remaining sequences may be performed in operation 650.

A time at which operation 650 ends may be earlier than the second time described in operation 640. For example, the processor may perform the sequences for powering off the electronic device before the second time. The second time may be set in advance by considering the time at which operation 650 ends.

In operation 660, the connection control switch of the power supply circuit may switch the operation mode of the electronic device to the ship mode based on the ship mode command received from the control circuit. For example, as the battery switch control circuit 570 turns off switches (e.g., the switches 571 and 572 of FIG. 5), the operation mode of the electronic device may be switched to the ship mode. A time at which the operation mode of the electronic device is switched to the ship mode may be the second time.

The power supply circuit may switch the operation mode of the electronic device to the ship mode by shutting off power supplied to the processor by a battery (e.g., the battery 189 of FIG. 1, the battery 320 of FIG. 3, or the battery 541 of FIG. 5) of the electronic device. For example, the connection control switch that receives the ship mode command at the second time may break an electrical connection between a PMIC (e.g., the PMIC 332 of FIG. 3 or the PMIC 520 of FIG. 5), which manages the power supplied to the processor, and the battery based on the ship mode command.

When the operation mode of the electronic device is switched to the ship mode, a voltage value of the power supplied to the processor by the power supply circuit may be less than or equal to a preset voltage value. For example, the preset voltage value may be 0. For example, a value of a system voltage (VSYS) may be 0 in the ship mode.

According to an aspect, the value of the system voltage (VSYS) may be maintained at a normal value from the first time at which the ship mode command is generated by the processor before the second time, which is a time after the processor ends the sequences for powering off the electronic device, and the value of the system voltage may be 0 after the second time at which the operation mode of the electronic device is switched to the ship mode.

Figure 7:
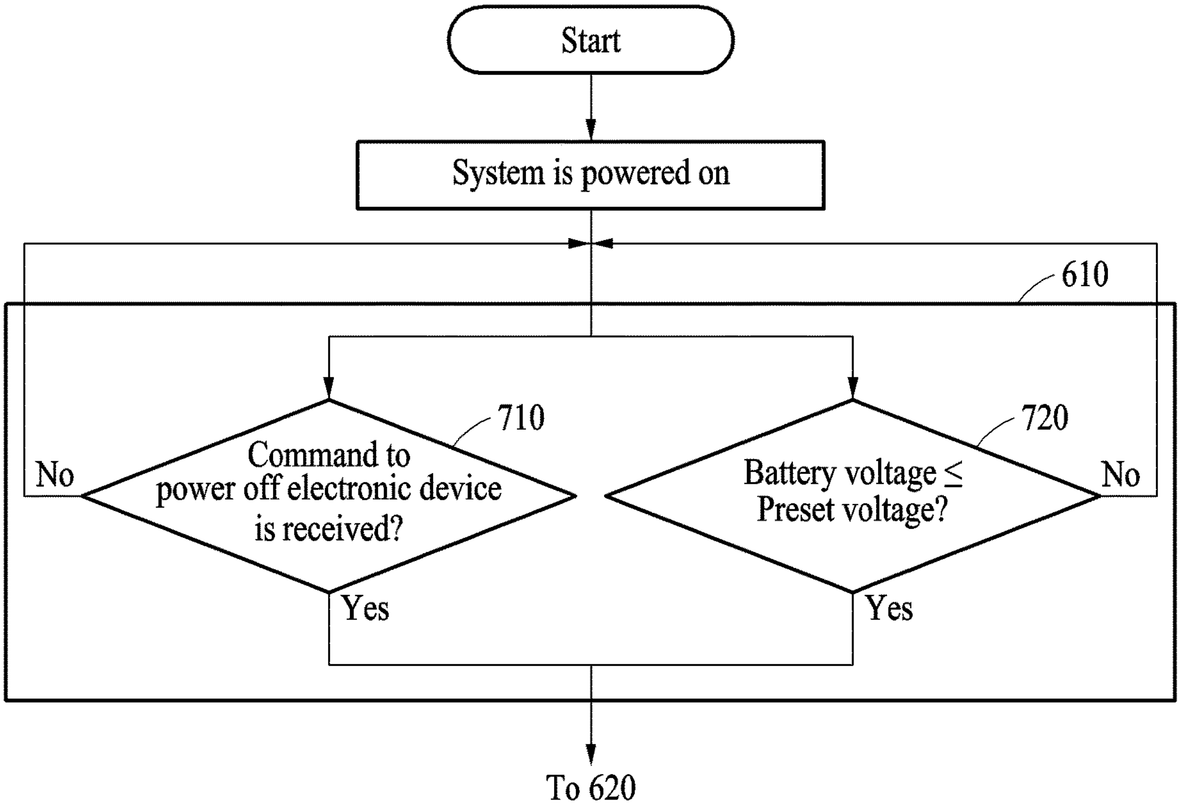
FIG. 7 is a flowchart of a method of detecting a situation in which an electronic device is powered off according to an embodiment.

FIG. 7 is a flowchart of a method of detecting a situation in which an electronic device is powered off according to an embodiment.

Operation 610 of FIG. 6 may include operations 710 and 720 to be described hereinafter. For example, operation 610 may be performed in a state in which a system of an electronic device is powered on.

In operation 710, a processor (e.g., the processor 120 of FIG. 1 or the processor 530 of FIG. 5) may determine whether a power-off command for the system of the electronic device (e.g., the electronic device 101 of FIG. 1, the electronic device 300 of FIG. 3, or the electronic device 500 of FIG. 5) is received. In an embodiment, the electronic device may receive the power-off command from a user through a user interface (e.g., the interface 177 of FIG. 1). For example, the power-off command may be received through a power key of the electronic device. As another example, the power-off command may be received through an object output on a display of the electronic device.

In operation 720, the processor may determine whether a voltage value of a battery is less than or equal to a preset voltage value. For example, the preset voltage value may be a voltage value at which the system is normally driven. According to an embodiment, the processor may preset a voltage value at which sequences for powering off the electronic device may be performed.

Operations 710 and 720 may be performed in parallel or independently. In other words, when a condition for one of operations 710 and 720 is satisfied, it may be determined that the power-off command for the system of the electronic device is received.

According to an aspect illustrated in FIG. 7, operations 710 and 720 may be performed in parallel or independently. Other embodiments may be possible.

According to another aspect, when operation 710 is performed and when it is determined that the command to power off the electronic device is not received, operation 720 may be performed subsequently.

According to yet another aspect, when operation 720 is performed and when it is determined that a voltage of the battery exceeds the preset voltage, operation 710 may be performed subsequently.

Even if the battery has a voltage value enough to drive the electronic device, power may need to be supplied to the processor first in order to perform a sequence for powering on the electronic device since a connection between a power supply circuit and the processor is broken in a ship mode. Methods of switching an operation mode of an electronic device from a ship mode to a normal mode in order to supply power to the processor are described in detail below with reference to FIGS. 8 and 9.

Figure 8:
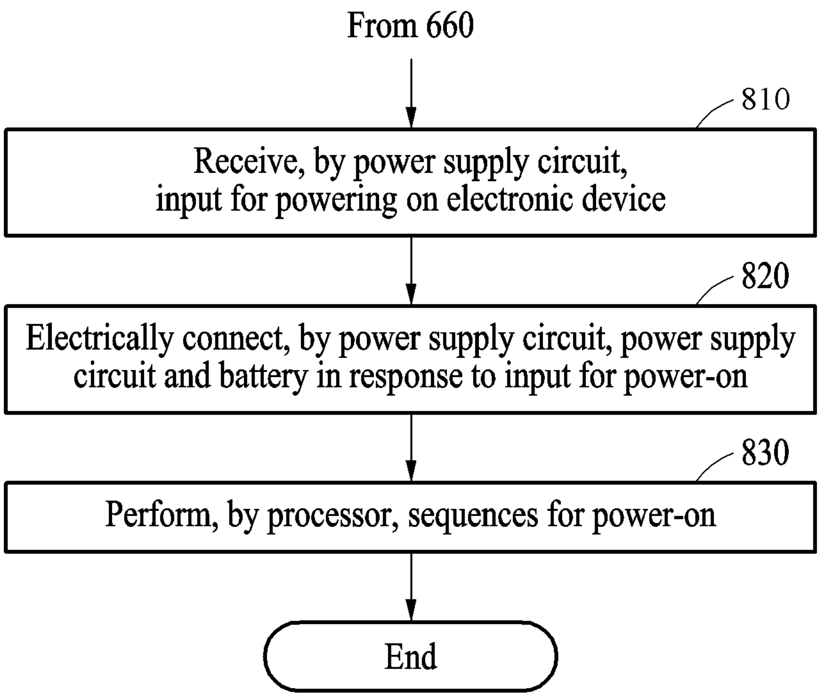
FIG. 8 is a flowchart of a method of switching an operation mode of an electronic device from a ship mode to a normal mode based on an input for power-on according to an embodiment.

FIG. 8 is a flowchart of a method of switching an operation mode of an electronic device from a ship mode to a normal mode based on an input for power-on according to an embodiment.

According to an aspect, operations 810 to 830 may be performed after operation 660 of FIG. 6 is performed.

In operation 810, a power supply circuit may receive an input for powering on an electronic device. For example, the electronic device may receive the input for power-on based on a designated operation (e.g., an input for power-on through a power key or button).

When the electronic device is switched to a ship mode in a state in which a battery has power enough to operate a system of the electronic, a user may turn off the ship mode through a power key of the electronic device even when the user does not input an external power source to the electronic device. For example, the ship mode may be used to ship the electronic device after it is produced. As another example, the user may switch the operation mode of the electronic device to the ship mode by powering off the electronic device to efficiently use the battery of the electronic device.

In operation 820, a connection control switch of the power supply circuit may electrically connect a PMIC and the battery in response to the input for power-on. For example, the connection control switch may control the electrical connection between the PMIC and the battery to be turned on through a switch. According to an aspect, the switch of the connection control switch may be operated by a mechanical input for power-on from the user. For example, the mechanical input for power-on may apply physical pressure to the switch, and the switch may be turned on by the pressure. According to an aspect, the connection control switch may control the switch based on a separate battery for the connection control switch.

When the PMIC and the battery are electrically connected, power may be supplied to a processor through the PMIC.

In operation 830, the processor may perform sequences for power-on. For example, the system of the electronic device may boot up as the processor performs the sequences for power-on.

Figure 9:
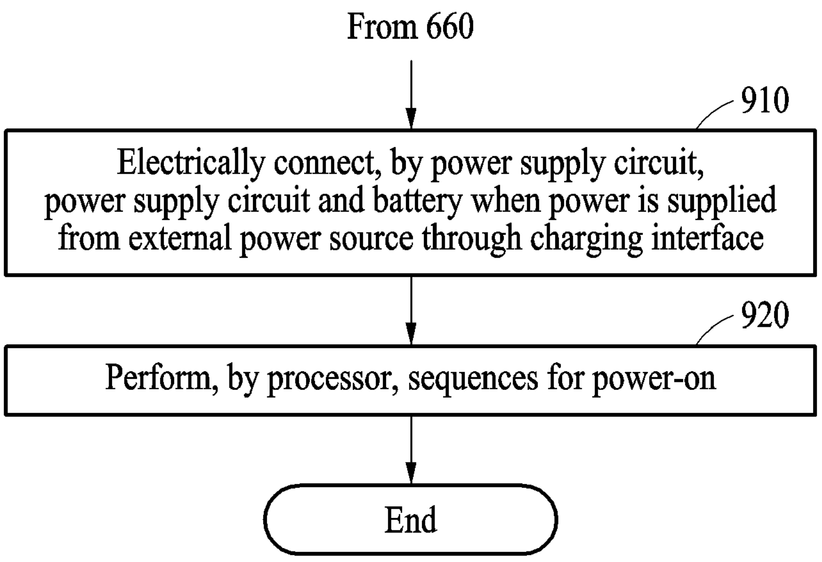
FIG. 9 is a flowchart of a method of switching an operation mode of an electronic device from a ship mode to a normal mode based on an external power source according to an embodiment.

FIG. 9 is a flowchart of a method of switching an operation mode of an electronic device from a ship mode to a normal mode based on an external power source according to an embodiment.

According to another aspect, operations 910 and 920 may be performed after operation 660 of FIG. 6 is performed.

In operation 910, when power is supplied from an external power source through a charging interface (e.g., the interface 177 of FIG. 1 or the charging interface 310 of FIG. 3), a power supply circuit may electrically connect the power supply circuit (e.g., a PMIC) and a battery. For example, a control circuit may transmit a command (e.g., a power okay (POK) signal) to turn on a switch using a connection control switch. When a PMIC and a battery are connected, power may be supplied from a processor through the PMIC. For example, referring back to FIG. 5, the MCU 560 may transmit a POK signal for turning on the switches 571 and 572 using the battery switch control circuit 570.

In operation 920, the processor may perform sequences for power-on.

According to one or more embodiments, an electronic device 300 may include a battery 320, a power supply circuit 330 electrically connected to the battery 320 and configured to manage power supplied to the electronic device 300, and a processor 530 configured to control the electronic device 300 by receiving power through the power supply circuit 330, wherein when receiving a ship mode command from the processor 530 at a first time, the power supply circuit 330 may switch an operation mode of the electronic device 300 to a ship mode by shutting off power supplied to the processor 530 by the battery 320 at a second time delayed from the first time by a preset time.

The processor 530 may generate the ship mode command and transmit the generated ship mode command to the power supply circuit 330 when a command to power off the electronic device 300 is received.

The processor 530 may generate the ship mode command and transmit the generated ship mode command to the power supply circuit 330 when a voltage of the battery 320 is less than or equal to a preset voltage.

The processor 530 may perform sequences for powering off the electronic device 300 before the second time.

The power supply circuit 330 may include a control circuit 335 configured to receive the ship mode command from the processor 530 and delay performing the ship mode command until the second time, a PMIC 332 configured to manage the power supplied to the processor 530, and a connection control switch 337 configured to control an electrical connection between the PMIC 332 and the battery 320 based on the ship mode command.

The control circuit 335 may delay performing the ship mode command until the second time through or by using firmware.

The control circuit 335 may delay performing the ship mode command until the second time through or by using a delay circuit.

The connection control switch 337 may electrically connect the PMIC 332 and the battery 320 in response to an input for powering on the electronic device 300.

The electronic device 300 may further include a charging interface 310 electrically connected to the battery 320 through the connection control switch 337 and receiving power from an external power source by wire or wirelessly.

The connection control switch 337 may electrically connect the PMIC 332 and the battery 320 when power is supplied from the external power source through the charging interface 310.

The electronic device 300 may be a mobile communication terminal, a smartwatch, or smart glasses.

According to one or more embodiments, a ship mode switching method performed by the electronic device 300 may include operation 630 of receiving, by the power supply circuit 330 of the electronic device 300, a ship mode command from the processor 530 of the electronic device 300 at a first time and operation 660 of switching an operation mode of the electronic device 300 to a ship mode by shutting off power supplied to the processor 530 by the battery 320 at a second time delayed from the first time by a preset time.

The ship mode switching method may further include operation 630 of receiving, by the processor 530, a command to power off the electronic device 300, operation 620 of generating a ship mode command when the processor 530 receives the command to power off, and operation of transmitting, by the processor 530, the generated ship mode command to the power supply circuit 330.

The ship mode switching method may further include operation 650 of performing, by the processor 530, sequences for powering off the electronic device 300 before the second time.

The power supply circuit 330 may include the control circuit 335 configured to receive the ship mode command from the processor 530 and delay performing the received ship mode command until the second time, the PMIC 332 configured to manage the power supplied to the processor 530, and the connection control switch 337 configured to control an electrical connection between the PMIC 332 and the battery 320 based on the ship mode command.

The ship mode switching method may further include operation 810 of receiving, by the power supply circuit 330, an input for powering on the electronic device 300 and operation 820 of electrically connecting, by the connection control switch 337, the PMIC 332 and the battery 320 in response to the input for power on.

The ship mode switching method may further include operation 910 of electrically connecting, by the connection control switch 337, the PMIC 332 and the battery 320 when power is supplied from an external power source through the charging interface 310.

A voltage value of the power supplied to the processor 530 by the power supply circuit 330 after the second time may be less than or equal to a preset voltage value.

According to one or more embodiments, the electronic device 300 may include the battery 320, the power supply circuit 330 electrically connected to the battery 320 and configured to manage power supplied to the electronic device 300, and the processor 530 configured to control the electronic device 300 by receiving power through the power supply circuit 330, wherein when the processor 530 generates a ship mode command to switch an operation mode of the electronic device 300 to a ship mode at a first time, a voltage value of power supplied to the processor 530 by the power supply circuit 330 may be less than or equal to a preset voltage value after a second time delayed from the first time by a preset time.

The preset voltage value may be 0.

The above-described hardware devices may be configured to act as one or more software modules in order to perform the operations of the above-described embodiments, or vice versa.

Although the embodiments have been described with reference to the limited drawings, one of ordinary skill in the art may apply various technical modifications and variations based thereon. For example, suitable results may be achieved if the described techniques are performed in a different order and/or if components in a described system, architecture, device, or circuit are combined in a different manner or replaced or supplemented by other components or their equivalents.

Therefore, other implementations, other embodiments, and equivalents to the claims are also within the scope of the following claims.

What is claimed is:

1. An electronic device comprising:

a battery;

a power supply circuit electrically connected to the battery; and a processor configured to receive power through the power supply circuit, wherein the power supply circuit is further configured to, based on a ship mode command received from the processor at a first time, switch an operation mode of the electronic device to a ship mode of the electronic device by shutting off power supplied to the processor by the battery at a second time that is delayed from the first time by a preset time, wherein the power supply circuit comprises:

a control circuit configured to receive the ship mode command from the processor and delay performing the ship mode command until the second time;

a power management integrated circuit (PMIC) electrically connected to the control circuit and configured to manage power supplied to the processor; and a connection control switch electrically connected to the PMIC and the battery, and configured to control an electrical connection between the PMIC and the battery based on the ship mode command.

2. The electronic device of claim 1, wherein the processor is further configured to, based on a command to power off the electronic device being received, generate the ship mode command and transmit the ship mode command to the power supply circuit.

3. The electronic device of claim 1, wherein the processor is further configured to, based on a voltage of the battery, the voltage being less than or equal to a preset voltage, generate the ship mode command and transmit the generated ship mode command to the power supply circuit.

4. The electronic device of claim 1, wherein the processor is further configured to perform sequences of powering off the electronic device before the second time.

5. The electronic device of claim 1, wherein the control circuit is further configured to delay performing the ship mode command until the second time by using firmware.

6. The electronic device of claim 1, wherein the control circuit is further configured to delay performing the ship mode command until the second time by using a delay circuit.

7. The electronic device of claim 1, wherein the connection control switch is further configured to electrically connect with the PMIC and the battery based on an input for powering on the electronic device.

8. The electronic device of claim 1, further comprising a charging interface electrically connected to the battery through the connection control switch, the charging interface being configured to receive power from an external power source.

9. The electronic device of claim 8, wherein the connection control switch is further configured to, based on power supplied from the external power source via the charging interface, electrically connect the PMIC and the battery.

10. The electronic device of claim 1, wherein the electronic device is a mobile communication terminal, a smartwatch, or smart glasses.

11. A method performed by an electronic device, the method comprising:

receiving, by a power supply circuit of the electronic device, a ship mode command from a processor of the electronic device at a first time; and switching, by the power supply circuit, an operation mode of the electronic device to a ship mode by shutting off power supplied to the processor by a battery at a second time that is delayed from the first time by a preset time, wherein the receiving the ship mode command comprises receiving, by a control circuit of the power supply circuit, the ship mode command from the processor, and wherein the switching the operation mode comprises:

delaying, by the control circuit, performing the received ship mode command until the second time; and controlling, by a connection control switch of the power supply circuit, an electrical connection between a power management integrated circuit of the power supply circuit and the battery based on the ship mode command.

12. The method of claim 11, further comprising:

receiving, by the processor, a command to power off the electronic device;

based on the command to power off being received, generating, by the processor, the ship mode command; and transmitting, by the processor, the generated ship mode command to the power supply circuit.

13. The method of claim 11, wherein a voltage value of power supplied to the processor by the power supply circuit is less than or equal to a preset voltage value after the second time.

14. An electronic device comprising:

a battery;

a power supply circuit electrically connected to the battery; and a processor configured to receive power through the power supply circuit, wherein, when the processor generates a transportation mode command for switching an operation mode of the electronic device to the transportation mode at a first time, a voltage value of power supplied to the processor by the power supply circuit after a second time delayed by a predetermined time from the first time indicates a preset voltage value or less, wherein the power supply circuit comprises:

a control circuit configured to receive the transportation mode command from the processor and delay performing the transportation mode command until the second time;

a power management integrated circuit (PMIC) electrically connected to the control circuit and configured to manage power supplied to the processor; and a connection control switch electrically connected to the PMIC and the battery, and configured to control an electrical connection between the PMIC and the battery based on the transportation mode command.

* * * * *